(12) United States Patent
Le Pivert (10) Patent No.: US 8,396,694 B2
(45) Date of Patent: Mar. 12, 2013

(54) METHOD OF FORECASTING THE ELECTRICAL PRODUCTION OF A PHOTOVOLTAIC DEVICE

(75) Inventor: Xavier Le Pivert, Tresserve (FR)

(73) Assignee: Commissariat a l'Energie Atomique, Paris (FR)

( * ) Notice: Subject to any disclaimer, the term of this patent is extended or adjusted under 35 U.S.C. 154(b) by 410 days.

(21) Appl. No.: 12/686,793

(22) Filed: Jan. 13, 2010

(65) Prior Publication Data

US 2010/0185337 A1   Jul. 22, 2010

(30) Foreign Application Priority Data

Jan. 19, 2009   (FR) ...................................... 09 00223

(51) Int. Cl.
*G06F 17/50* (2006.01)
(52) U.S. Cl. .................. 703/2; 703/5; 703/19; 700/291; 700/295; 705/37
(58) Field of Classification Search .................. 703/2, 5, 703/19; 700/295, 291; 705/37
See application file for complete search history.

(56) References Cited

U.S. PATENT DOCUMENTS

| | | | | |
|---|---|---|---|---|
| 2002/0194113 | A1* | 12/2002 | Lof et al. ........................ | 705/37 |
| 2004/0056648 | A1* | 3/2004 | Matsuyama ..................... | 324/96 |
| 2006/0276938 | A1* | 12/2006 | Miller ............................. | 700/295 |
| 2009/0230696 | A1* | 9/2009 | Enis et al. ....................... | 290/1 B |
| 2010/0029268 | A1* | 2/2010 | Myer et al. ................. | 455/426.1 |
| 2011/0049992 | A1* | 3/2011 | Sant'Anselmo et al. ....... | 307/64 |
| 2011/0276269 | A1* | 11/2011 | Hummel ............................. | 702/3 |
| 2011/0282514 | A1* | 11/2011 | Ropp et al. ..................... | 700/297 |
| 2011/0295506 | A1* | 12/2011 | Hoff ................................... | 702/3 |
| 2011/0307109 | A1* | 12/2011 | Sri-Jayantha ................. | 700/291 |

FOREIGN PATENT DOCUMENTS

| | | |
|---|---|---|
| EP | 1 660 917 B | 11/2007 |
| WO | WO 2005/019870 A | 3/2005 |

OTHER PUBLICATIONS

Search Report issued by French Patent Office for priority French application 09 00223, dated Jul. 13, 2009.
Casa Nova, Jorge et al.: "Solar Irradiation Forecast Model Using Time Series Analysis and Ski Images", 2005 EFITA/WCCA Joint Congress on IT in Agriculture, Jul. 25, 2005, pp. 1408-1415.
Ransome, Steve: "How Well do PV Modelling Algorithms Really Predict Performance", URL:http://www.steveransome.com/PUBS/2007Milan_4EP_1_1_paper.pdf, Jan. 1, 2007, pp. 1-10.

(Continued)

*Primary Examiner* — Thai Phan
(74) *Attorney, Agent, or Firm* — Frommer Lawrence & Haug LLP; Ronald R. Santucci (57) ABSTRACT

A method of forecasting the electrical production of a photovoltaic device comprising photovoltaic modules (1), comprising a first part of estimating the lighting that will be received in the plane of the photovoltaic modules (1) and a second part of estimating the electrical production of the photovoltaic device, characterized in that it comprises the following first step:

(E1)—determination of whether a period concerned is sunny or cloudy, and characterized in that it comprises the following second step (E2) of implementing at least one of the following two steps:

(E2)—correction of the second part of the method of forecasting the electrical production based on the measurement of the true electrical production of the photovoltaic modules if the period concerned is sunny; and/or correction of the first part of the method of forecasting the electrical production based on the measurement of the true electrical production of the photovoltaic modules if the period concerned is cloudy.

15 Claims, 9 Drawing Sheets

OTHER PUBLICATIONS

Drews, A. et al.: "Monitoring and remote failure detection of gridconnected PV systems based on satellite observations", *Solar Energy* 81 (2007), pp. 548-564.

Bofinger, Stefan et al.: "Solar Electricity Forecast-Approaches and First Results", URL:http://www.envisolar.com/factsheets/meteocontrol_bofinger_dresden.pdf, Jul. 10, 2009, pp. 1-5.

* cited by examiner

New Sheet

METHOD OF FORECASTING THE ELECTRICAL PRODUCTION OF A PHOTOVOLTAIC DEVICE

This application claims priority benefits of French Patent Application No. 09 00223 filed Jan. 19, 2009, the disclosure of which is incorporated herein by reference.

The invention relates to a method of forecasting the electrical production of a photovoltaic device. It also relates to software implementing such a method and a photovoltaic device implementing such a method. Finally, it relates to a use of this method to diagnose a photovoltaic device.

The share of electrical energy production originating from photovoltaic installations is rapidly increasing. A particular feature of this solar production stems from the fact that it is very irregular since it varies strongly according to meteorological conditions. Now, when these installations are connected to an electrical network, this unpredictable nature induces a difficulty in managing the entire network, since it becomes difficult to guarantee a balance between energy production and demand. More generally, this unpredictable nature of the electrical production is detrimental to any device whose energy source relies at least partly on solar energy.

To overcome this drawback, there are models for forecasting the electrical production from photovoltaic installations, based on meteorological forecasts. Such a solution is, for example, explained in the document EP1660917. However, the electrical production of a photovoltaic installation depends on numerous parameters and it is difficult to develop a very accurate model. In practice, it is necessary to exploit the meteorological forecasts to deduce very localized forecasts therefrom, until the forecast of the lighting in the plane of the photovoltaic modules is obtained, to finally estimate the electrical production of the installation based on a predefined efficiency. In all these steps, there are numerous errors and approximations. The existing models finally give inaccurate and unsatisfactory results.

Thus, a general object of the invention is to propose a more accurate and reliable solution for forecasting the electrical production of a photovoltaic device.

To this end, the invention relies on a method of forecasting the electrical production of a photovoltaic device comprising photovoltaic modules, comprising a first part of estimating the lighting that will be received in the plane of the photovoltaic modules and a second part of estimating the electrical production of the photovoltaic device, characterized in that it comprises the following first step:

determination of whether a past considered period is sunny or cloudy, and characterized in that it comprises the following second step of implementing at least one of the following two steps:

correction of the second part of the method of forecasting the electrical production based on the measurement of the true electrical production of the photovoltaic modules over the period concerned if this period concerned is sunny; and/or correction of the first part of the method of forecasting the electrical production based on the measurement of the true electrical production of the photovoltaic modules over the period concerned if this period concerned is cloudy.

The invention also relates to a computer medium comprising software able to implement the method of forecasting the electrical production of a photovoltaic device as described previously.

The invention also relates to a photovoltaic device comprising photovoltaic modules, and an element for measuring their true electrical production, characterized in that it comprises a management unit implementing the method of forecasting the electrical production as described previously.

The invention also relates to the use of the method of forecasting the electrical production of a photovoltaic device as described previously to diagnose the state of a photovoltaic device.

The invention is also defined in details by the claims.

These objects, characteristics and advantages of the present invention will be explained in detail in the following description of a particular embodiment given as a nonlimiting example in relation to the appended figures in which.

Figure 1:
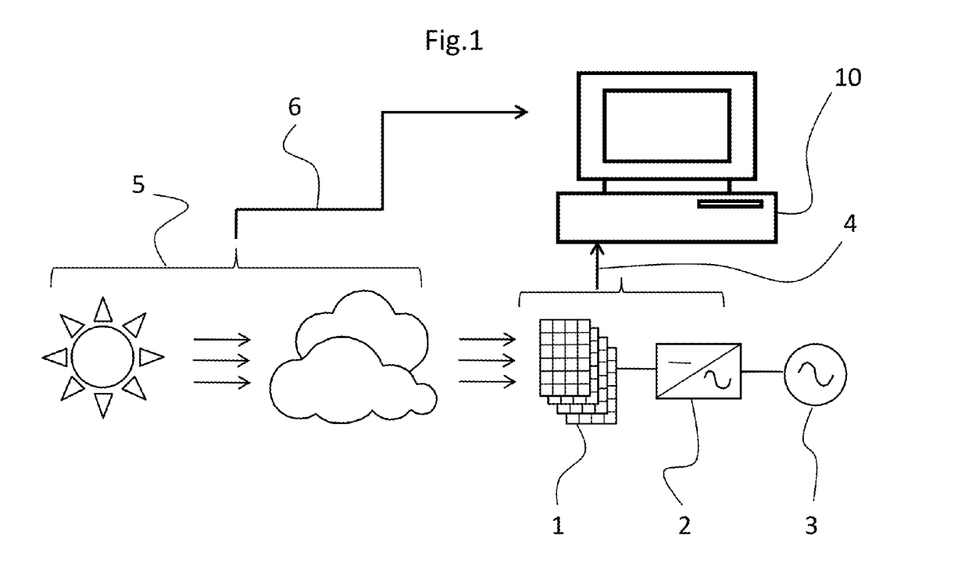
FIG. 1 diagrammatically illustrates a photovoltaic device according to one embodiment of the invention.

FIG. 1 diagrammatically represents a photovoltaic device according to one embodiment of the invention. This device comprises a number of photovoltaic modules 1 linked to the conventional electrical network 3 via an inverter 2. The modules can, of course, be linked to a standalone application through a converter. This device also includes a control or management unit 10 relying on a computer that includes software implementing the method of forecasting electrical production that will be described hereinbelow. The control unit 10 receives the measurement of the true electrical production from the photovoltaic installation 1,2 via a link 4. Also, this control unit 10 receives as input, via a communication means 6, the meteorological forecast data established by a meteorological forecasting entity 5.

Figure 2:
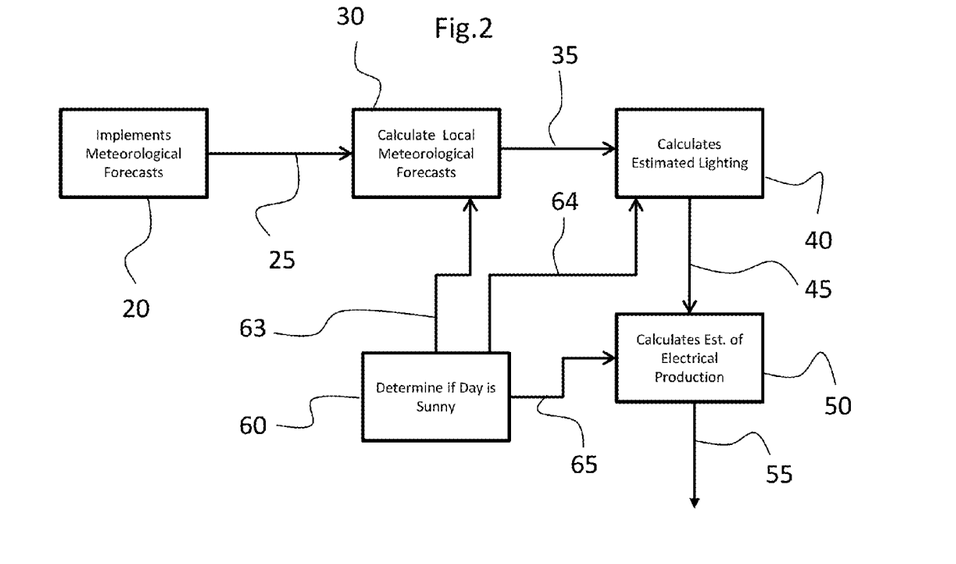
FIG. 2 diagrammatically illustrates the various blocks of the method of forecasting photovoltaic production according to the embodiment of the invention.

The control unit 10 therefore implements a method of forecasting the electrical production of the photovoltaic device, which relies on different blocks represented in FIG. 2. This control unit can be located on the site of the photovoltaic device or remote from that site. It can consist of software and/or hardware computation means, one or more storage means for storing the information to be processed and communication means.

The block 20 implements metrological forecasts. This preliminary part is implemented by a meteorological entity 5 external to the photovoltaic production device, according to all methods: the invention does not relate specifically to this block. The results 25 obtained by this block 20 are transmitted by the communication means 6 to the control unit 10 of the photovoltaic device. These data 25, which particularly include the irradiation; illuminance or lighting and ambient temperature, represent the essential inputs for the method of estimating electrical production that will be implemented by the management unit 10, and that relies on four blocks 30, 40, 50, 60 that will now be described.

The first block 30 implements the calculation of local meteorological forecasts that are more refined than those transmitted by the meteorological entity 5. For this, it uses statistical interpolation and/or correlation methods and/or historical databases of forecasts and measurements by meteorological stations, in order to obtain as the result 35 meteorological forecast quantities, such as the illuminance or lighting in a horizontal plane and the temperature, with a spatial and temporal pitch that is finer than that of the meteorological data 25 received from the block 20. In practice, these forecasts 25 transmitted by the block 20 are generally transmitted by a mesh arrangement of a few kilometers and a temporal step of a few hours, which is insufficient at the scale of a photovoltaic production site. The calculations implemented in this first block 30 therefore rely on a first calculation model.

Then, these results 35 of local meteorological forecasts are used by a second block 40 that will calculate the estimated lighting in the plane of the photovoltaic modules, using a second calculation model.

The results 45 obtained by the second block 40 are then used by a third block 50 which finally calculates an estimate of the electrical production 55 of the photovoltaic device according to its performance levels, that are modelled by a loss coefficient, or by an efficiency, which can be dependent on the temperature and lighting.

All the above blocks rely initially on various theoretical and/or empirical approaches, possibly belonging to the state of the art. The results 35, 45, 55 obtained at each step exhibit a certain error and uncertainty. According to an essential element of the invention, at least one of the three models, preferentially all three, implemented respectively by the blocks 30, 40, 50, is improved from the direct or indirect comparison between the measurement of the true electrical production and the value of the production estimated over a given period, and according to the sunny or non-sunny situation of this same period.

For this, a final block 60 of the method of estimating electrical production transmits data 63, 64, 65 to the blocks 30, 40 and 50 to improve the models implemented in these blocks according to an empirical learning mechanism. According to the principle of the invention, this learning depends on two essential steps:

E1—determination of whether the day concerned is sunny or not;

E2—correction of a part of the method of estimating electrical production, that part being determined according to the result of the step E1, the correction relying on the comparison between the direct or indirect measurement of a quantity, this quantity being directly measured if it concerns the electrical production or indirectly deduced from this measured electrical production in the other cases, and the estimation of this same quantity obtained by the method implemented in the management unit 10 of the device.

The block 60 therefore implements a first step E1 that is essential to the invention, that consists in determining whether a past considered is sunny or not. The concept of the invention involves considering that, if the day is sunny, the results obtained by the blocks 30 and 40 of the inventive method are correct, that is to say that the lighting estimated in the plane of the photovoltaic modules is accurate. The error observed on the value of the forecast of electrical production by the method, by its comparison with the true value as measured, is then due solely to the inaccuracy of the third calculation module implemented at the level of the third block 50. This approach is tantamount to considering that, in sunny weather, the error committed by the first two blocks 30, 40 is negligible compared to that committed by the third block 50. On the contrary, if the day is not sunny, we qualify it simply as "cloudy" in the interests of simplifying the description, the final error observed between the forecast of the electrical production and the true measurement of this production is assigned to the first two blocks 20, 30 or to one of them, the error generated by the third block 50 then being considered to be negligible.

This learning concept offers the advantage of making it possible to empirically improve the calculation models implemented by the method from the single measurement of true production obtained for the photovoltaic device. It does not necessitate several different measurements for the separate processing of the various blocks of the method, and, for example, does not necessitate any sunlight sensor like a pyranometer, which is relatively costly.

The first step E1 of determining the type of day, sunny or cloudy, will now be described. The principle of this determination relies on the comparison between, on the one hand, the measured electricity production, relying on a series of measurements E11 with, for example, a periodicity of between 1 second and 10 minutes, and the same series obtained for the theoretical electricity production in clear weather, by assuming clear weather, preferably according to a frequency in phase with the series of measurements. To obtain this series of values of theoretical electrical production in clear weather, a first substep consists in determining the forecast series of the lighting E12 in the plane of the photovoltaic modules in clear weather by any existing model, for example with that implemented in the management unit 10. This series can also be corrected from meteorological forecasts. Also, a series of ambient temperatures is established E13, either by measurement, or by calculation using models, or based on meteorological forecasts. Finally, the photovoltaic production in clear weather E14 is then calculated with the block 50 of the method of the management unit 10 of the photovoltaic device, from these series of lighting and temperature values, taking into account losses or performance levels at the level of the photovoltaic modules as assessed by the model implemented at the level of the management unit 10.

When the two series to be compared are obtained, it finally remains to be determined whether the day should be considered to be sunny or cloudy. This qualification is applied by the detection of any cloudy passages, which are easily detectable since the lighting, and consequently the electrical production, then drops by approximately 80%. The day will not be considered to be cloudy if there is only a single short cloudy passage. A predefined threshold is used to set a limit between a day that can be considered to be a sunny day and a cloudy day. This final qualification step is complicated by the fact that a shadow zone on the photovoltaic modules can be provoked by the environment of the photovoltaic device, such as a building casting shadow at a certain time, and not by a cloudy passage. The method therefore makes the distinction between the passage of a cloud and such shade. For this, the method of defining the type of day relies not only on the analysis of the ratio between the measured electrical power and the theoretical electrical power in clear weather E15, but also on the analysis of the derivative of this ratio E16, to take account of the speed of variation of this ratio. Two temporal series are therefore obtained, from which abnormal events are detected, defined by a certain predefined threshold. As soon as the quantity of abnormal events exceeds a certain threshold E17, the day is considered to be non-sunny, and otherwise it is sunny.

To sum up, the first step E1 of determining the type of day, sunny or cloudy, comprises the following substeps:

E11—measurement according to a predefined frequency of the true electricity production;

E14—determination of the theoretical electricity production in clear weather from an estimation of the lighting in the plane of the photovoltaic modules in clear weather E12 and from the establishment of a series of ambient temperatures E13;

E15—analysis of the ratio between the measured electrical power and the theoretical electrical power assuming clear weather, by detecting any abnormal events;

E16—analysis of the derivative of this ratio, by detecting any abnormal events;

E17—determination of the type of day, by comparing the quantity of abnormal events detected against a predefined threshold.

As a variant, the above method can be simplified by implementing only one of the two analysis steps E15, E16. Furthermore, the method could include a preliminary step for detection of the masks, that is to say the natural obstacles such as mountains, buildings, etc., that create shade at the level of the photovoltaic modules, at least in certain periods of the year.

Figure 3:
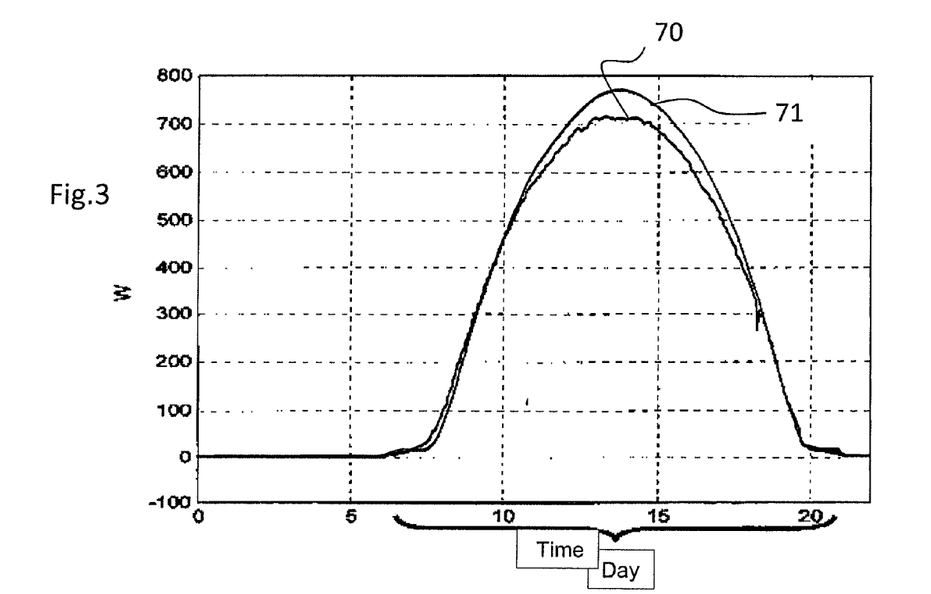
FIG. 3 represents the electrical powers measured and forecast over a day according to a first scenario for implementing the embodiment of the invention.
Figure 4:
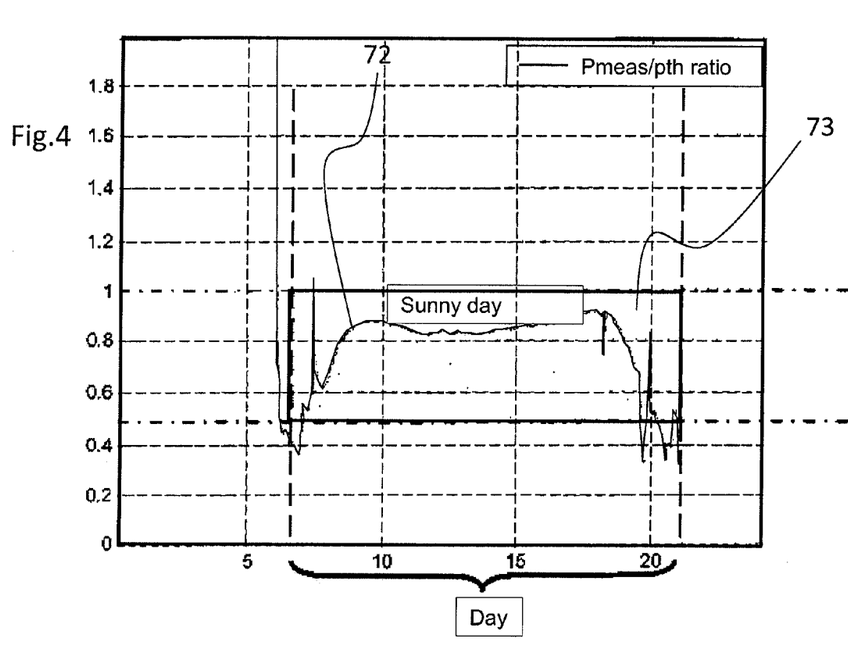
FIG. 4 represents the ratio between the measured electrical power and the theoretical electrical power in clear weather according to time, according to the first scenario for implementing the embodiment of the invention.
Figure 5:
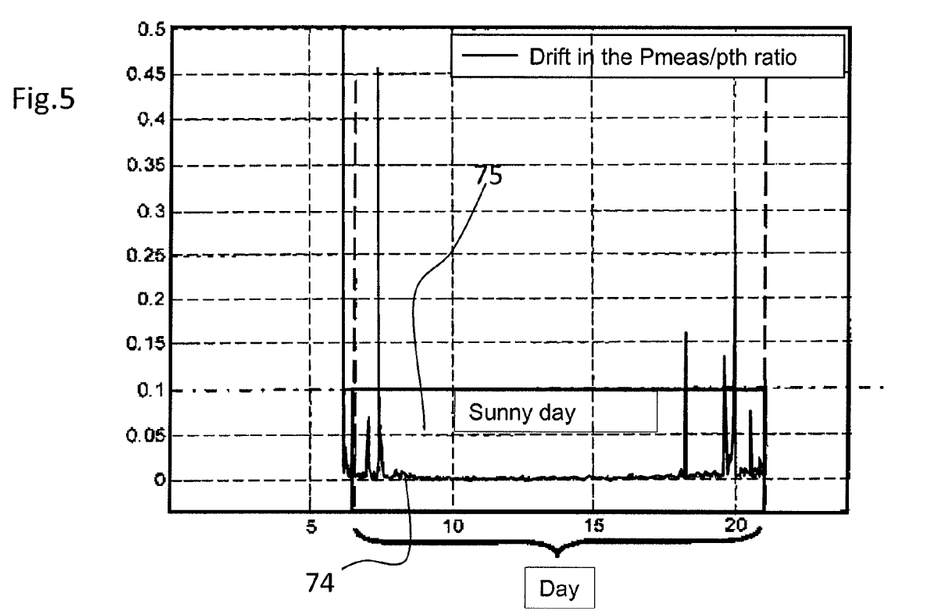
FIG. 5 represents the absolute value of the derivative (differential coefficient) of the ratio between the measured electrical power and the theoretical electrical power in clear weather according to time, according to the first scenario for implementing the embodiment of the invention.

FIGS. 3 to 5 illustrate a first exemplary implementation of the step E1 described previously. FIG. 3 represents two curves 70, 71 respectively corresponding to the measured and theoretical electrical powers in clear weather over a day according to a first scenario. FIG. 4 represents the ratio 72 between measured electrical power and a theoretical electrical power in clear weather according to time for this scenario. In this figure, a rectangular zone 73 corresponds to a threshold beyond which the event is considered abnormal. When the curve 72 remains within this area 73, the situation corresponds to a sunny situation. According to this embodiment, the area 73, called "sunny day", is defined for a value of the power ratio 72 of between 0.5 and 1. Finally, FIG. 5 illustrates the curve 74 of the absolute value of the derivative of the power ratio according to time. Similarly, a rectangular zone 75 defined by a value of this ratio of between 0 and 0.1 corresponds to a sunny day situation. Finally, it emerges that the two curves 72, 74 of the ratio of measured power to theoretical power in clear weather and of the absolute value of its differential coefficient (derivative analysis) very rarely depart from the sunny zones 73, 75. The day concerned with this scenario can therefore be considered to be a sunny day.

Figure 6:
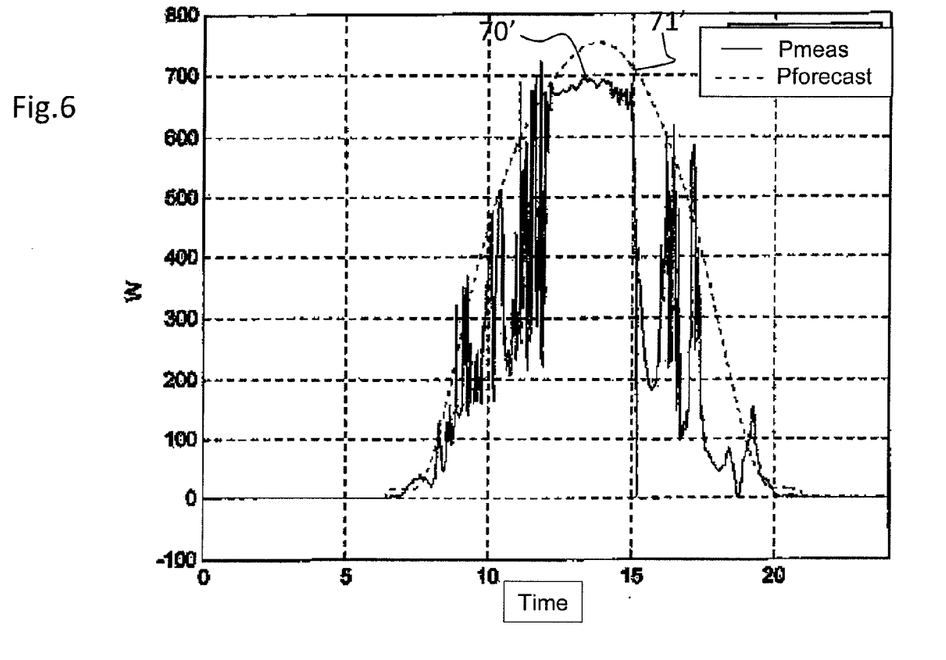
FIG. 6 represents the measured and theoretical electrical powers in clear weather over a day according to a second scenario for implementing the embodiment of the invention.
Figure 7:
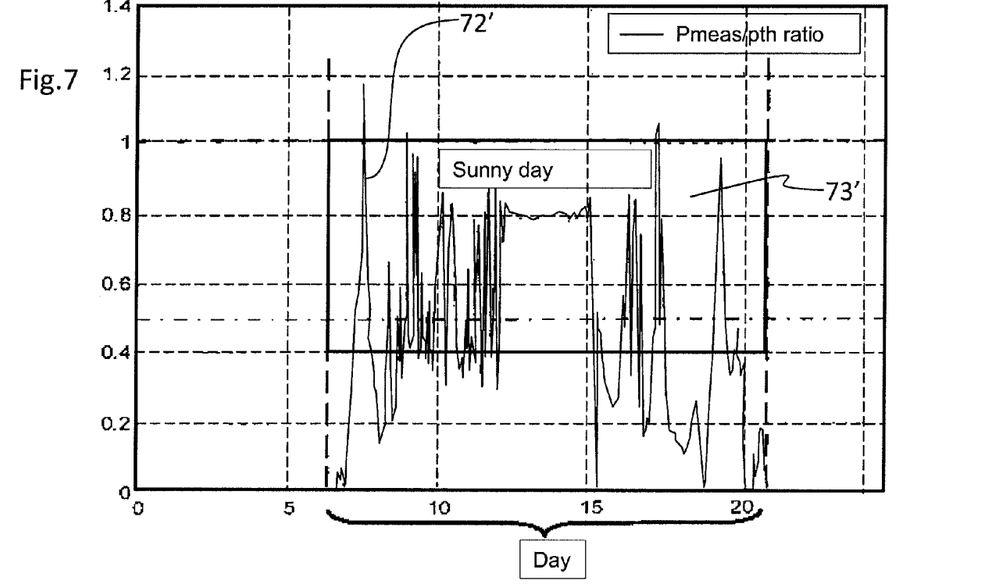
FIG. 7 represents the ratio between the measured electrical power and the theoretical electrical power in clear weather according to time, according to the second scenario for implementing the embodiment of the invention.
Figure 8:
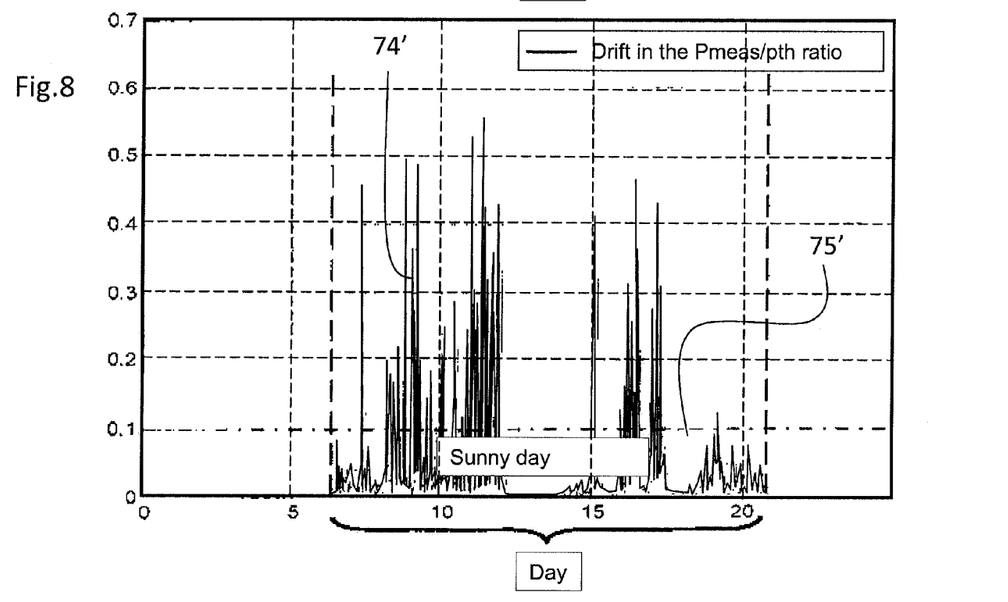
FIG. 8 represents the absolute value of the derivative of the ratio between the measured electrical power and the theoretical electrical power in clear weather according to time, according to the second scenario for implementing the embodiment of the invention.

FIGS. 6 to 8 illustrate a second exemplary implementation of the step E1 described previously. FIG. 6 represents two curves 70', 71' respectively corresponding to the measured and theoretical electrical powers in clear weather according to a second scenario of a day. FIG. 7 represents, according to time, the ratio 72' of measured electrical power to theoretical electrical power in clear weather for this scenario. In this figure, the rectangular zone 73' corresponds to a sunny situation, for a value of the power ratio 72' of between 0.5 and 1. Finally, FIG. 8 illustrates the curve 74' of the absolute value of the derivative of the power ratio according to time. Similarly, the rectangular zone 75' defined by a value of between 0 and 0.1 of the absolute value of this derivative corresponds to a sunny day situation. Finally, it emerges that the two curves 72', 74' of the ratio of measured power to theoretical power in clear weather and of the absolute value of its derivative very often depart from the sunny zones 73', 75'. The day concerned with this scenario is therefore considered to be a cloudy day.

Finally, the method of forecasting the electrical production of the photovoltaic device implements a second step E2 which distinguishes two situations according to the result of the first step E1.

First of all, if the day is sunny and the meteorological forecasting entity had forecast this, it is considered that the first part of the calculation of the method implemented by the first two blocks 30, 40 is correct, that is to say that the lighting forecast in the plane of the photovoltaic modules exhibits a satisfactory result, the error of which is negligible. This lighting is therefore considered to be true lighting, equivalent to that which would be obtained from a measurement. Thus, in such a situation, the error observed between the measured true electricity production and that which was forecast by the method depends solely on the third calculation model implemented by the third block 50 of the method. This calculation consists in determining the production of the photovoltaic device according to the lighting, taking into account power losses according to temperature. The observed error is used to correct this third calculation model, by correcting the loss coefficient used in this third model. This correction can be done on each sunny day, by immediately modifying the loss coefficient of the model in order to immediately reuse it for future implementations of the method. As a variant, the recalculated loss coefficient can be stored in a memory of the management unit 10, and serve as a basis for a periodic recalculation of a new loss coefficient based on these stored values, such as a simple average of these values for example. The new value of the loss coefficient then replaces the preceding one for the future electrical production forecast calculations. Thus, teaching from the sunny days makes it possible for the third model used in the method of forecasting electrical production to learn, the other calculation models implemented in this method remaining unchanged during these sunny day periods.

Figure 9:
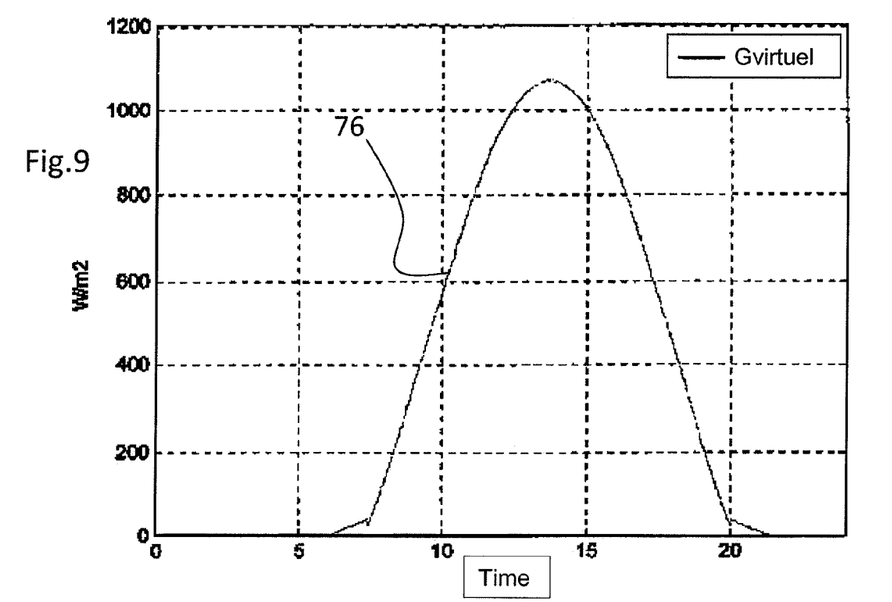
FIG. 9 illustrates the lighting according to time, according to another scenario for implementing the embodiment of the invention.
Figure 10:
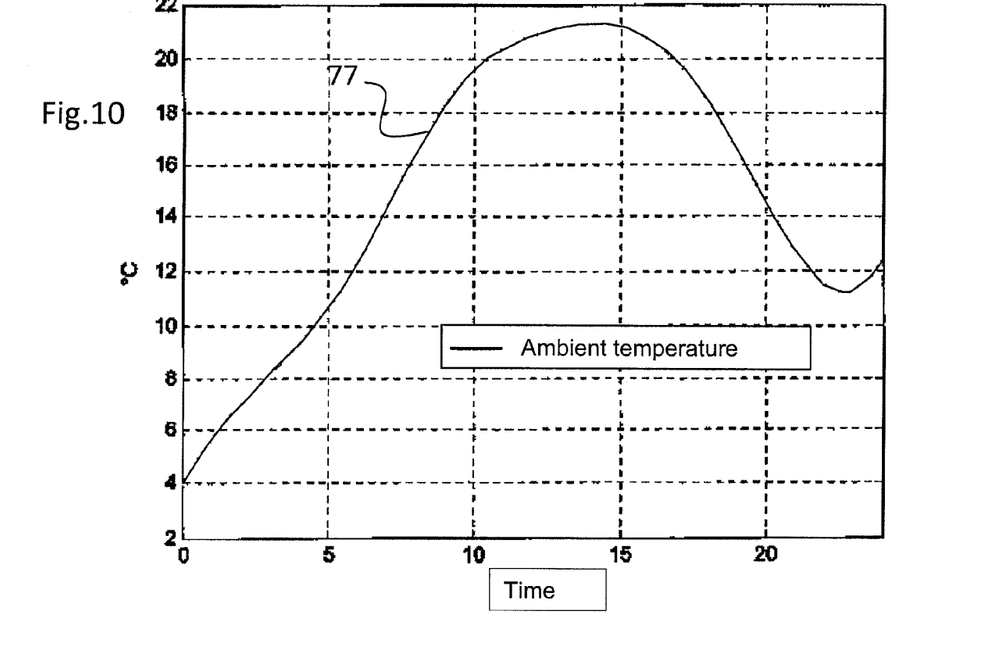
FIG. 10 illustrates the temperature according to time, according to this other scenario for implementing the embodiment of the invention.
Figure 11:
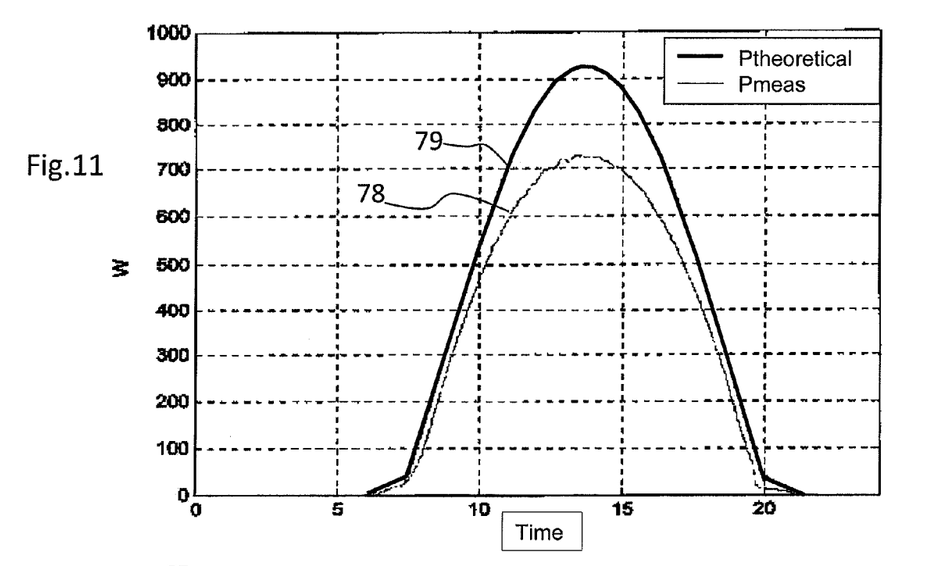
FIG. 11 illustrates the productions measured and forecast according to time, according to this scenario for implementing the embodiment of the invention.
Figure 12:
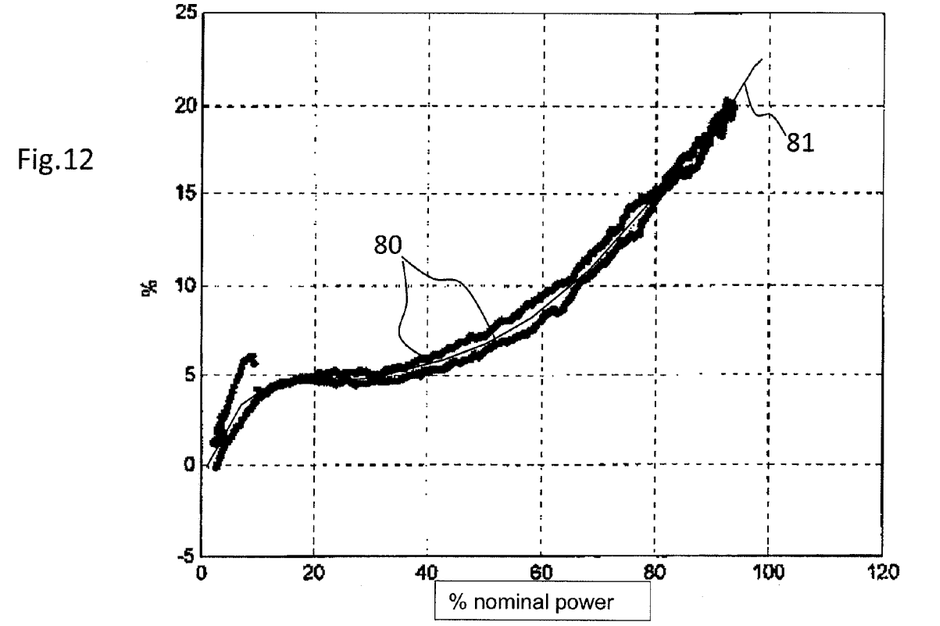
FIG. 12 represents the losses in photovoltaic production according to the ratio of the forecast power to nominal power according to the scenario for implementing the embodiment of the invention.
Figure 13:
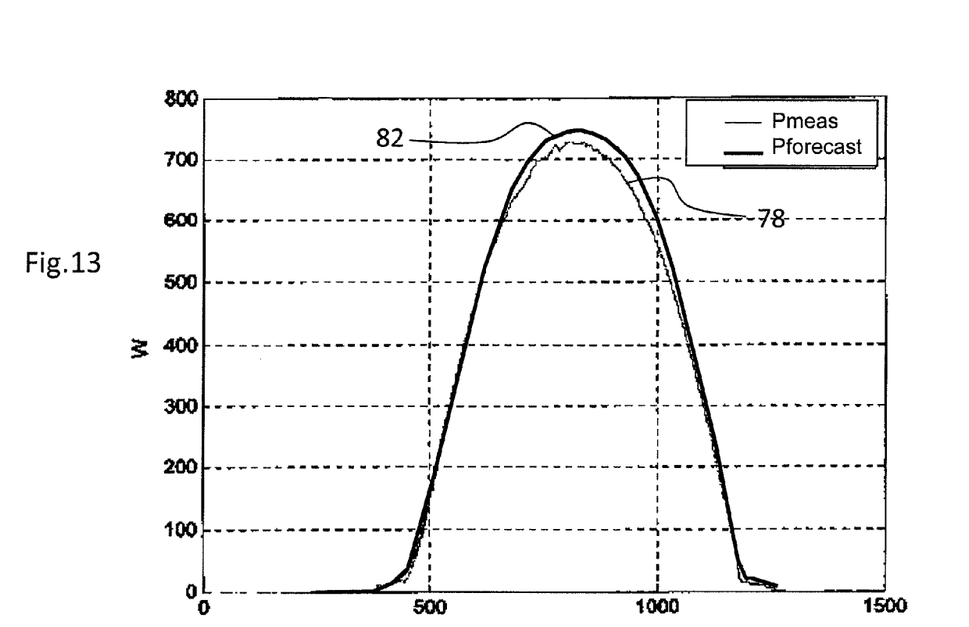
FIG. 13 illustrates the measured and forecast productions after correction according to time, according to the scenario for implementing the embodiment of the invention.

FIGS. 9 to 13 illustrate an exemplary implementation of this second step E2 in the case of a sunny day. FIGS. 9 and 10 respectively illustrate the curves 76 and 77 of lighting and of temperature obtained according to time according to the selected scenario. FIG. 11 illustrates the curves of measured production 78 and forecast production 79 according to time during that day. The difference between the preceding two curves makes it possible to determine the losses according to the ratio of the forecast power to nominal power, which are represented by the curves 80 in FIG. 12. These losses are modelled by a polynomial represented by the curve 81 of this same figure. These losses obtained in this way and modelled make it possible to modify the loss coefficient of the third calculation model of the inventive forecasting method. By using this new coefficient for this scenario, a new curve 82 of forecast production is obtained that is far closer than the initial curve 79 of the measured production curve 78, as is illustrated in FIG. 13.

If the day is cloudy, it is considered that the third calculation model of the method is correct, that is to say that the electrical production calculated according to the lighting in the plane of the photovoltaic modules exhibits a satisfactory result, the error of which is negligible. Thus, in such a situation, the error observed between the measured true electricity production and that which is estimated by the method depends solely on the first two calculation models implemented by the method, as described with reference to at least one of the first two blocks 30, 40. The true electrical production is measured then, by applying an inverse calculation of the calculation implemented in the third block 50, a "virtual or indirect measurement", that is to say an indirect true value, of the lighting received by the photovoltaic modules is deduced therefrom. The first part of the model including the first two calculation models implemented within the blocks 30 and 40 also makes it possible to calculate an estimated lighting from the meteorological forecasts. These measured and estimated lightings are compared and their difference serves as a starting point for a correction of at least one of the two calculation models of the first two blocks 30, 40 of the method. This correction can involve various solutions. First of all, it may relate only to one of the two calculation models implemented, or to both. Then, it can rely on a calculation of correlations between the meteorological forecast and the local lighting, by a statistical approach or by neural networks.

According to a variant implementation of this second step E2 in a cloudy day situation, the second calculation model implemented in the second block 40 of the method is considered to be reliable. The correction step then consists in improving only the first calculation model implemented in the first block 30 of the method, which consists of an extrapolation of the meteorological data in order to obtain an estimation of the lighting in a horizontal plane. The true lighting in a horizontal plane is virtually known, by an inverse calculation of the second calculation model from the lighting in the plane of the photovoltaic modules which is deduced from the measurement of the true electrical production, as has been explained hereinabove. It therefore concerns a lighting that can be qualified as a virtual measurement, since it is indirectly measured by the measurement of the true electrical production. Then, the comparison between this measured virtual lighting and that estimated by the method serves as a basis for improving the first calculation model of the method.

Figure 14:
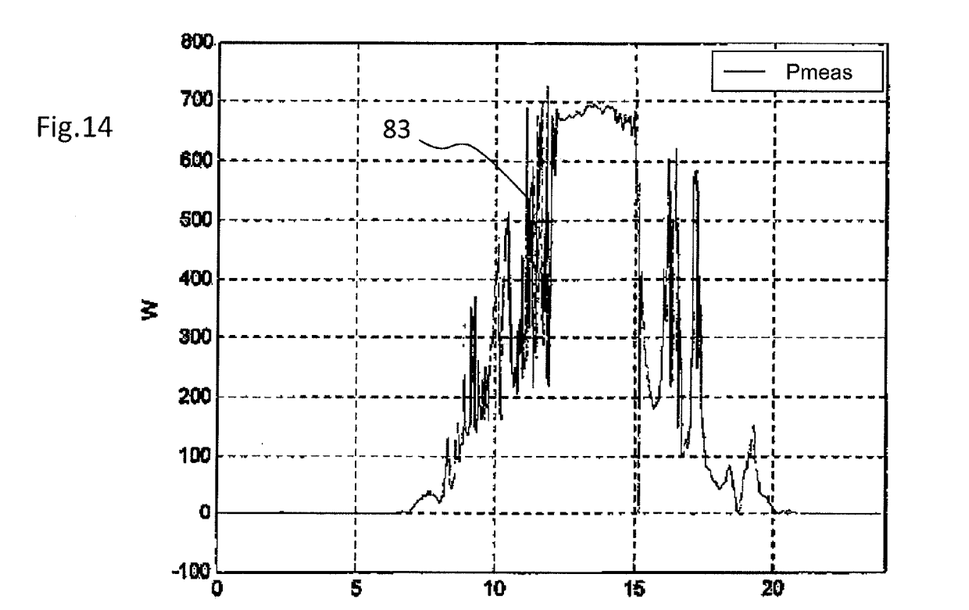
FIG. 14 illustrates the electrical production measured during a last cloudy day scenario for implementing the embodiment of the invention.
Figure 15:
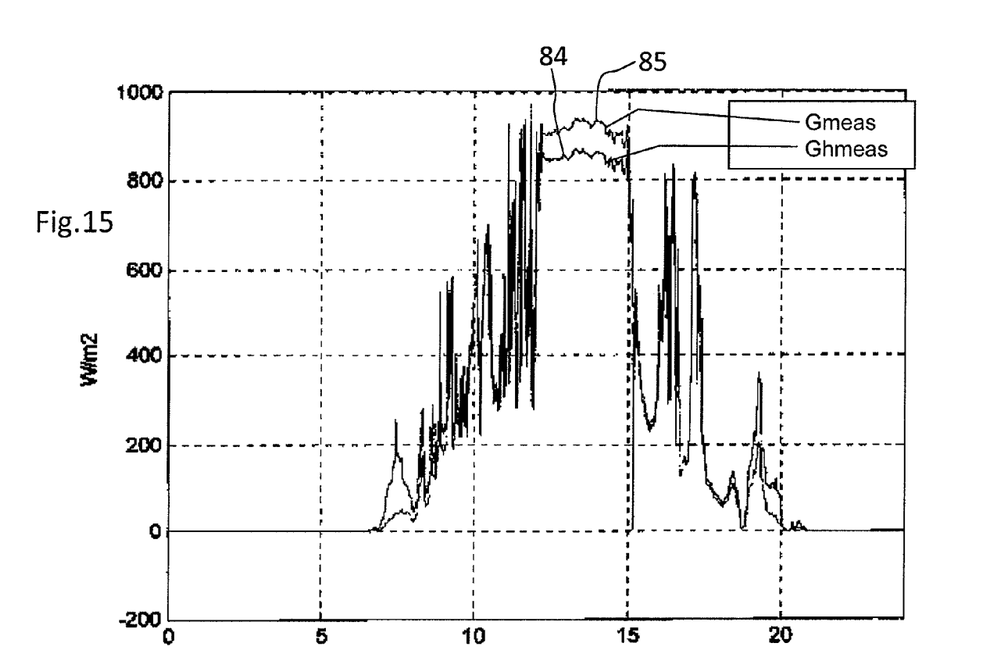
FIG. 15 represents the lightings calculated in the plane of the photovoltaic modules and in the horizontal plane according to this cloudy scenario.
Figure 16:
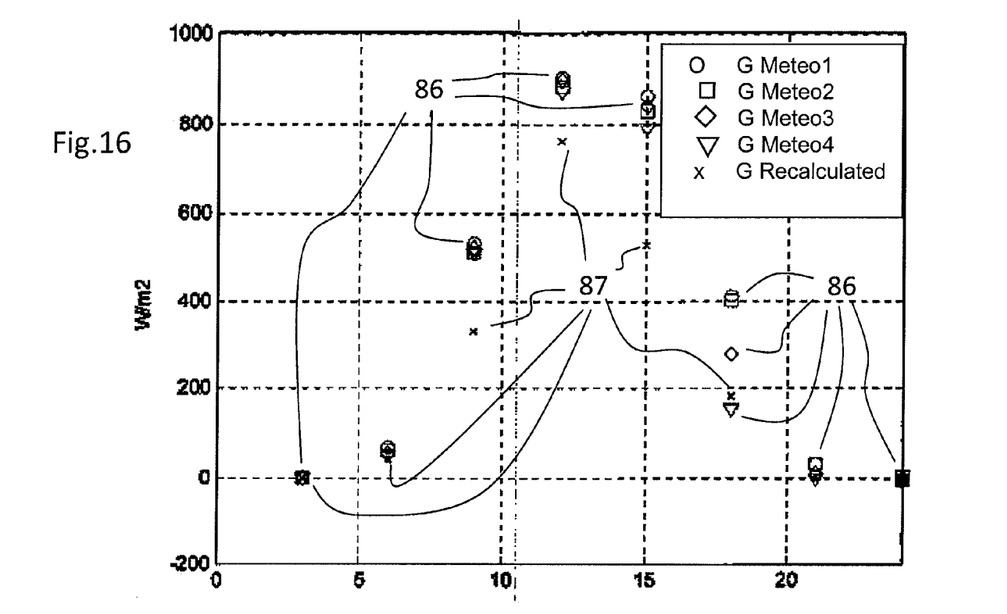
FIG. 16 illustrates lightings deriving from meteorological forecasts and lightings calculated by the method of the embodiment of the invention.
Figure 17:
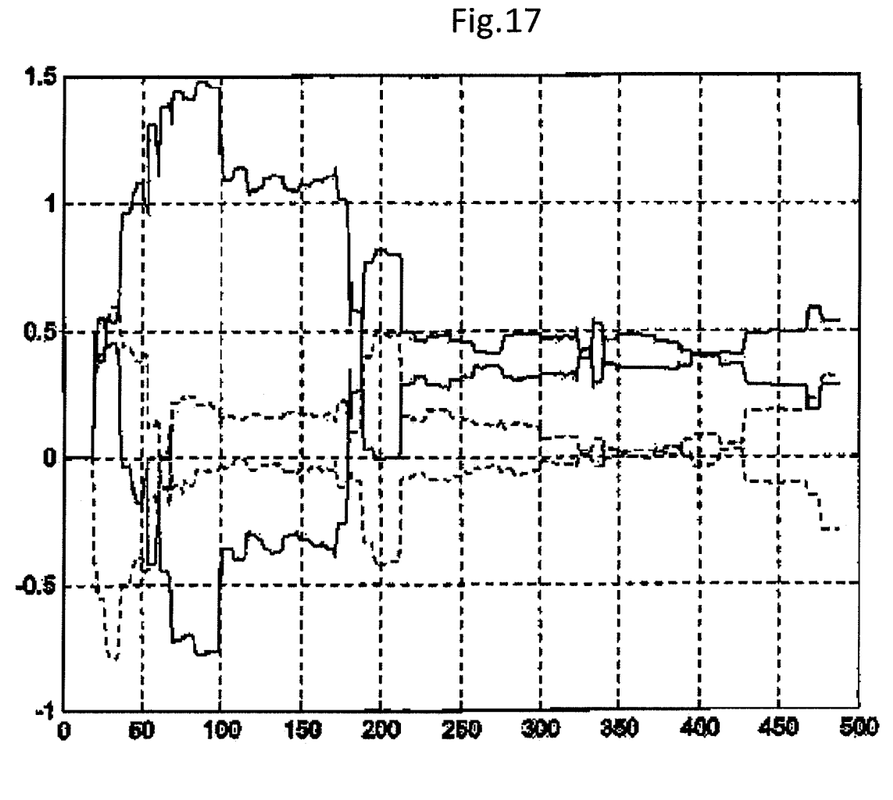
FIG. 17 illustrates the evolution of the weights according to the forecast irradiation added to different meteorological forecasts according to the embodiment of the invention.

FIGS. 14 to 17 illustrate an exemplary implementation of this second step E2 in the case of a cloudy day. FIG. 14 illustrates the curve 83 of the electrical production measured during the cloudy day. FIG. 15 respectively shows the curves 84 and 85 of lighting in the plane of the photovoltaic modules and in the horizontal plane according to time according to the selected scenario. FIG. 16 illustrates points 86 representing the lightings according to time obtained from the meteorological forecasts at four points around the photovoltaic production device, whereas the points 87 represent these same lightings measured virtually. It has been chosen here to select the four meteorological data points that are the closest to the production site. It is then possible to deduce therefrom the lighting on the site, for example by applying a weighting of each of the four points obtained by the meteorological data. The corresponding weights are determined and improved according to the database of measurements taken in cloudy weather. They can be calculated by purely statistical methods, by artificial intelligence, and so on. This database is used to recalculate the weights to obtain a more accurate result. Thus, FIG. 17 illustrates the trend over several months of the four weights concerned according to irradiation forecast in the four points concerned.

The learning mechanism has been described on the basis of a time breakdown on the scale of a day. However, any other time breakdown can be considered. For example, it is possible to follow the same principle on the basis of a half-day, by first determining whether this half-day is sunny or cloudy, then by continuing with the rest of the method. Also, the learning mechanism can be implemented over all these periods, or over only a part of these periods according to predefined criteria, such as only the periods for which measurements of the electrical production of the photovoltaic device are available with a sufficient frequency. Furthermore, it can be chosen to implement this learning mechanism only over a predefined limited duration, or this mechanism can be implemented in an unlimited, permanent manner.

The invention makes it possible preferably to improve the three main calculation models of the method, implemented within the three blocks 30, 40, 50. However, its use for any one of these three blocks already allows for improvement in the existing methods and does not depart from the concept of the present invention.

Also, the invention is advantageous in that it makes it possible to culminate in an improved method of forecasting electrical production using only the measurement of true electrical production. However, this concept of the invention can be combined with any other system for empirically correcting the calculation models, implemented on the basis of other measurements for example, without departing from the concept of the invention.

Furthermore, the invention has been described by using certain important quantities such as lighting, which represents a received power per unit of surface area. As a variant, other similar quantities can be used to implement the same calculations and the same method, such as, for example, the irradiation, which represents the received energy per unit of surface area. It is possible to switch from lighting to irradiation by a simple conversion and the use of one or other of these quantities in the method represents equivalent solutions.

The inventive method has been presented according to an abstract breakdown into different blocks 30, 40, 50, 60 to facilitate its understanding. However, it represents an indivisible whole whose various elements can be nested in a more complex manner. In fact, the method is subdivided into two large main parts; the first part combines the first two blocks 30, 40 and can be used to format the meteorological forecasts at the level of the photovoltaic modules of the device whereas the second part consists of a calculation of the estimated electrical production of these photovoltaic modules precisely from these formatted meteorological forecasts. The last block 60 is in fact an element belonging to each of the preceding three models, since it participates in the calculation implemented by these models by defining some of the important parameters of these models. By this means, regardless of which initial calculation models are used as a starting point for the method, theoretical and/or empirical models, existing or not in the state of the art, these models, by their combination with the steps implemented by the block 60 of the invention become different, new and more powerful models. The essential part of the method described previously is therefore that implemented in the final block 60. This part of the method has been represented in the interests of simplifying the description as a distinct part of the method, but, according to a more correct view, as has been explained hereinabove, this final block 60 is an integral part of the method, is a part of at least one of the three main calculation models implemented within the three blocks 30, 40, 50, since essential parameters of at least one of these models are determined by this final block 60.

This invention is suited to any photovoltaic device, whether it is a large production unit or a small photovoltaic device associated with an appliance like a parking meter.

Furthermore, the invention finally makes it possible to determine a method of forecasting the electrical production of a photovoltaic installation that is reliable and accurate. It thus allows for other applications such as the implementation of a diagnostic of a photovoltaic installation. In practice, by comparing the true production with that estimated by the model, it is possible to deduce therefrom a measurement of the performance of the photovoltaic installation, and even, in the event of strong differences, to diagnose its failure.

The invention claimed is:

1. Method of forecasting the electrical production of a photovoltaic device comprising photovoltaic modules (1), comprising a first part of estimating the lighting that will be received in the plane of the photovoltaic modules (1) and a second part of estimating the electrical production of the photovoltaic device, characterized in that the method comprises the following first step:
   determination of whether a past considered period is sunny or cloudy, and characterized in that it comprises the following second step of implementing at least one of the following two steps:
   correction of the second part of the method of forecasting the electrical production based on the measurement of the true electrical production of the photovoltaic modules over the past considered period if this past considered period is sunny; and/or
   correction of the first part of the method of forecasting the electrical production based on the measurement of the true electrical production of the photovoltaic modules over the past considered period if this past considered period is cloudy.

2. Method of forecasting the electrical production of a photovoltaic device according to claim 1, wherein the first step for determining whether a past considered period is sunny or cloudy comprises the following substeps:
   measurement according to a predefined frequency during the past considered period of the true electricity production;
   determination of the theoretical electricity production assuming clear weather;
   analysis of the ratio between the measured electrical power and the theoretical electrical power assuming clear weather, by detecting any abnormal events and/or analysis of the derivative in this ratio, by detecting any abnormal events;
   determination of the type of day by comparing the quantity of abnormal events detected compared to a predefined threshold, the day being considered to be cloudy beyond this predefined threshold and sunny below this predefined threshold.

3. Method of forecasting the electrical production of a photovoltaic device according to claim 2, wherein the determination of the theoretical electricity production in clear weather is performed based on an estimation of the lighting in the plane of the photovoltaic modules in clear weather and based on the establishment of a series of ambient temperatures.

4. Method of forecasting the electrical production of a photovoltaic device according to claim 2, wherein the analysis of the ratio between the measured electrical power and the theoretical electrical power assuming clear weather consists in considering any value of this ratio between 0.5 and 1 to be a normal event.

5. Method of forecasting the electrical production of a photovoltaic device according to claim 2, wherein the analysis of the derivative of the ratio between the measured electrical power and the theoretical electrical power assuming clear weather consists in considering any event corresponding to an absolute value of the differential coefficient (from the derivative) of between 0 and 0.1 to be a normal event.

6. Method of forecasting the electrical production of a photovoltaic device according to claim 2, wherein it comprises a preliminary step for detection of natural obstacles such as mountains or buildings, that create shadows at the level of the photovoltaic modules.

7. Method of forecasting the electrical production of a photovoltaic device according to claim 1, wherein the first part of estimating the lighting that will be received in the plane of the photovoltaic modules (1) comprises a first block (30) implementing a first calculation model to determine the horizontal lighting received by the photovoltaic device based on meteorological forecasts and a second block (40) implementing a second calculation model to determine the lighting received in the plane of the photovoltaic devices (1), in that the second part of estimating the electrical production of the photovoltaic device comprises a third block (50) implementing a third calculation model, and in that, if the past considered period is cloudy, then at least one of the first two calculation models implemented by the first (30) and/or the second (40) block is corrected according to the deviation between the true lighting, deduced from the true electrical production measured by an inverse calculation of the third calculation model of the third block (50), and the lighting forecast by the forecasting method, the third calculation model remaining unchanged.

8. Method of forecasting the electrical production of a photovoltaic device according to claim 7, wherein, if the past considered period is cloudy, the true lighting in a horizontal plane is deduced from the lighting in the plane of the photovoltaic modules which is deduced from the measurement of the true electrical production by an inverse calculation of the second and third calculation models, and in that this true lighting in the horizontal plane is compared with that forecast by the first calculation model based on meteorological forecasts, this first model being corrected according to the difference between these two lighting values, the second and third calculation models remaining unchanged.

9. Method of forecasting the electrical production of a photovoltaic device according to claim 8, wherein the first calculation model comprises weightings of several meteorological forecasts forecast at various points close to the photovoltaic modules, and in that the correction of the first model comprises a phase of evolution of the different weights of the first model.

10. Method of forecasting the electrical production of a photovoltaic device according to claim 1, wherein the first part of estimating the lighting that will be received in the plane of the photovoltaic modules (1) comprises a first block (30) implementing a first calculation model to determine the horizontal lighting received by the photovoltaic device based on meteorological forecasts and a second block (40) implementing a second calculation model to determine the lighting received in the plane of the photovoltaic devices (1), in that the second part of estimating the electrical production of a photovoltaic device comprises a third block (50) implementing a third calculation model, and in that, if the period is sunny, then the third calculation model is corrected according to the deviation between the measured true electrical production and the electrical production forecast by the method of forecasting the electrical production, the first and second calculation models remaining unchanged.

11. Method of forecasting the electrical production of a photovoltaic device according to claim 1, wherein the correction of the forecasting method according to the value of the measured true electrical production consists in a new calculation of one or more parameter(s) of the method, this or these calculated parameters being immediately modified for the future application of the method or stored before a periodic processing operation making it possible to modify the parameter(s) of the method, this modification relying on statistical calculations and/or based on neural networks and/or artificial intelligence and/or polynomial-type modelling.

12. Method of forecasting the electrical production of a photovoltaic device according to claim 1, wherein the first step considers a period of a day, and determines whether this day is sunny or cloudy.

13. A non-transitory computer readable medium comprising a software for implementing the method of forecasting the electrical production of a photovoltaic device according to claim 1.

14. Photovoltaic device comprising photovoltaic modules (1) operatively linked to an element for measuring their true electrical production, wherein the photovoltaic device comprises a management unit (10) implementing the method of forecasting the electrical production according to claim 1.

15. Use of the method of forecasting the electrical production of a photovoltaic device according to claim 1 to diagnose the state of a photovoltaic device by comparing the true production with that estimated by the model and in the event of strong differences to diagnose failure of the photovoltaic device.

* * * * *